US009777491B2

(12) United States Patent
Grivetti et al.

(10) Patent No.: US 9,777,491 B2
(45) Date of Patent: Oct. 3, 2017

(54) STRUCTURAL 3D PRINTING MACHINE

(71) Applicant: Caterpillar Inc., Peoria, IL (US)

(72) Inventors: Tazio S. Grivetti, Chillicothe, IL (US); Christopher M. Sketch, Peoria, IL (US); Peter Lauterslager, Oss (NL); Edward van Amelsfoort, Tilburg (NL)

(73) Assignee: Caterpillar Inc., Peoria, IL (US)

( * ) Notice: Subject to any disclaimer, the term of this patent is extended or adjusted under 35 U.S.C. 154(b) by 60 days.

(21) Appl. No.: 14/805,930

(22) Filed: Jul. 22, 2015

(65) Prior Publication Data

US 2017/0021527 A1 Jan. 26, 2017

(51) Int. Cl.
*E04G 21/04* (2006.01)
*B33Y 30/00* (2015.01)
*B29C 67/00* (2017.01)
*B33Y 10/00* (2015.01)

(52) U.S. Cl.
CPC .......... *E04G 21/04* (2013.01); *B29C 67/0055* (2013.01); *B33Y 10/00* (2014.12); *B33Y 30/00* (2014.12)

(58) Field of Classification Search
CPC ...................................................... E04G 21/04
IPC ...................................................... E04G 21/04
See application file for complete search history.

(56) References Cited

U.S. PATENT DOCUMENTS

| 8,644,964 B2 | 2/2014 | Hendron et al. |
| 8,778,252 B2 | 7/2014 | Mackie et al. |
| 2008/0060822 A1* | 3/2008 | Salmi ..................... A62C 27/00 169/24 |
| 2013/0189435 A1* | 7/2013 | Mackie ............... B29C 67/0055 427/256 |
| 2015/0158251 A1 | 6/2015 | Carrouset et al. |
| 2015/0294033 A1* | 10/2015 | Cudak ..................... G06F 17/50 700/98 |

(Continued)

FOREIGN PATENT DOCUMENTS

| GB | 2502116 A | 11/2013 |
| WO | 2015065936 A2 | 5/2015 |

OTHER PUBLICATIONS

"Telescope", Merriam-Webster Dictionary, 2016, accessed at merriam-webster.com on Nov. 7, 2016.*

(Continued)

*Primary Examiner* — Alison L Hindenlang
*Assistant Examiner* — Jamel M Nelson
(74) *Attorney, Agent, or Firm* — Bookoff McAndrews PLLC

(57) ABSTRACT

Machines and system for 3D printing are disclosed. One machine includes a machine frame having a plurality of ground engaging elements to facilitate movement of the machine frame, a telescoping boom pivotably coupled to the machine frame and configured to pivot along at least a horizontal plane, a material line coupled to the boom and configured to convey a material therethrough, a printhead coupled to the boom and in fluid communication with the material line to receive the material and to dispense the material, and a controller configured to receive 3D printing information and to convert the 3D printing information into positional coordinates of the printhead, wherein the controller is to cause movement of the boom to position the printhead based at least on the position coordinates.

20 Claims, 5 Drawing Sheets

(56) References Cited

U.S. PATENT DOCUMENTS

2015/0367580 A1\* 12/2015 Touma ................ B29C 67/0055
                                                                                                        700/98
2016/0361834 A1\* 12/2016 Chen-Iun-Tai .......... B28B 1/001

OTHER PUBLICATIONS

"Telehandler with Stabilizers", Caterpillar, 2012, accessed at cat.com on Nov. 7, 2016.\*

\* cited by examiner

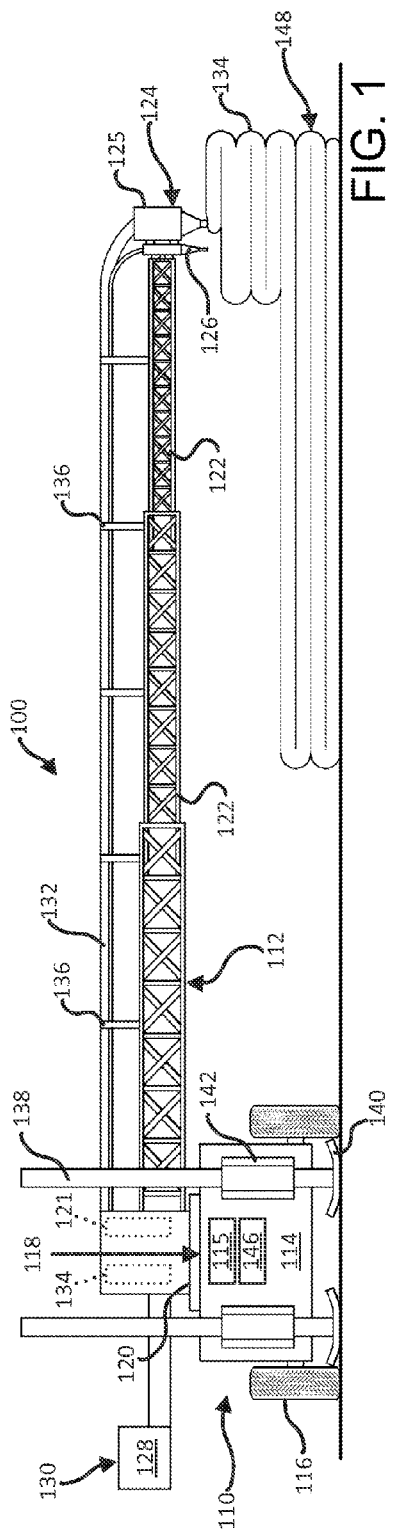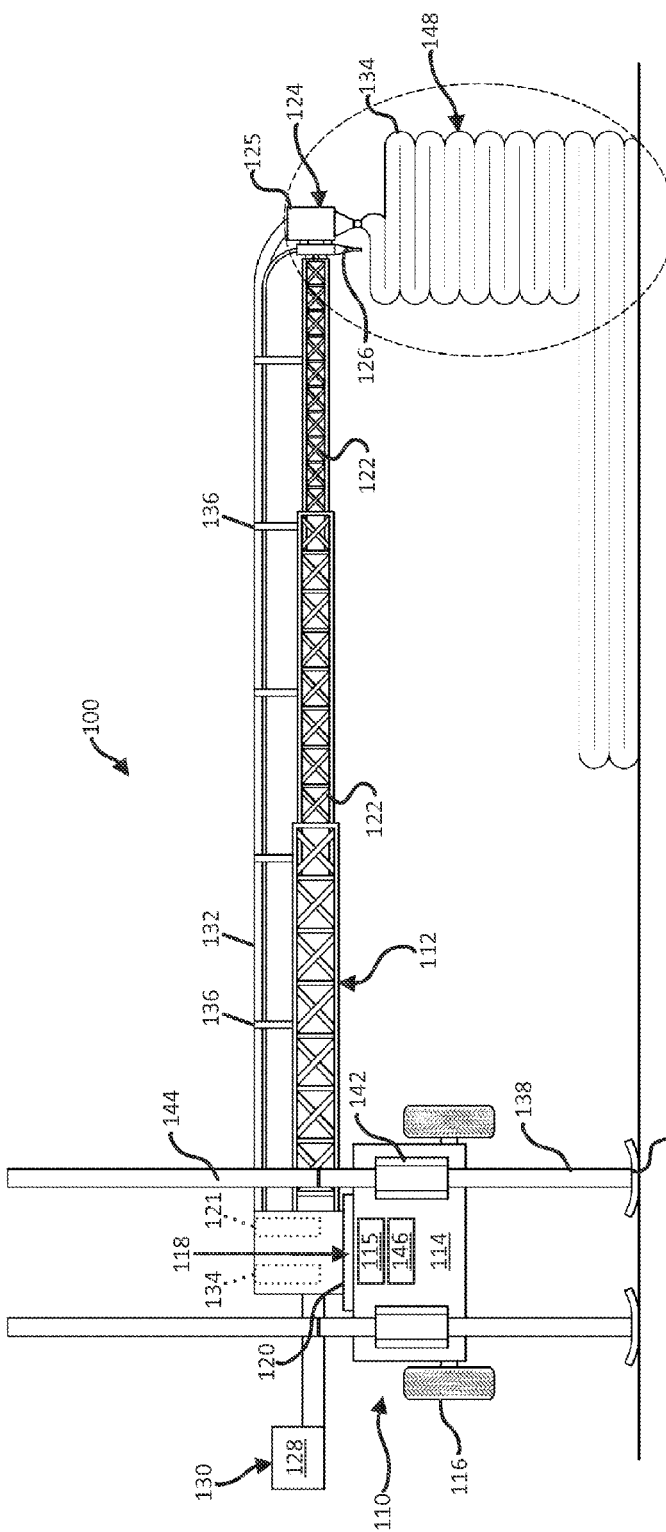

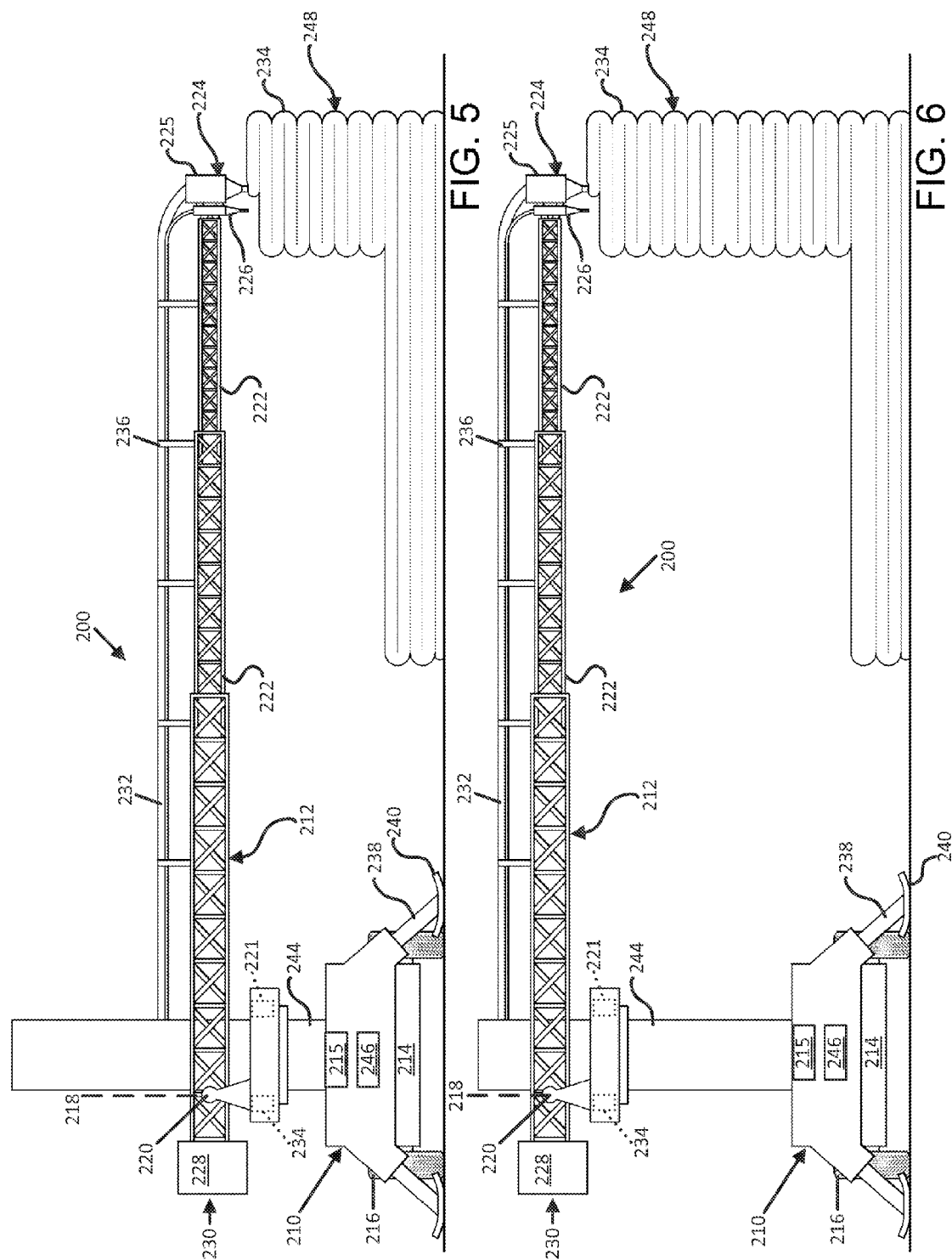

STRUCTURAL 3D PRINTING MACHINE

TECHNICAL FIELD

This patent disclosure relates generally to structural three dimensional printing and, more particularly, to a structural three dimensional printing machine.

BACKGROUND

Three-dimensional (3-D) printing (also known as additive manufacturing or rapid prototyping) allows for the production of three-dimensional objects by building up a material on a layer-by-layer basis. One common 3-D printer employs a printhead extruding material and movable in three Cartesian axes (x,y,z) with respect to a print surface. Under the control of a computer, the printhead moves through a series of positions over the printing surface and at each location deposits a small volume of material to define a portion of the printed object at that location. After a base layer is printed directly on the printing surface, the printhead is successively elevated (z-axis) to print additional layers on top of the base layer and then each succeeding layer until the entire object is printed.

As an example, U.S. Pat. No. 8,644,964 describes an excavator that includes an upper frame pivotally mounted to an undercarriage. The excavator also includes a large boom that extends from an upper frame adjacent to a cab. The boom is rotatable about a vertical arc by actuation of a pair of boom cylinders. A dipper stick or arm is rotatably mounted at one end of the boom and its position is controlled by a cylinder. The dipper stick or arm is mounted to an end effector in the form of a printhead that is pivotable relative to the arm by means of a cylinder. This method limits the height of any structure constructed, to the reach of the combined boom and dipper stick. Additionally, every time the print head is to be moved, the boom angle must be adjusted in conjunction with the dipper stick angle being adjusted, as well as the rotation of the machine being adjusted.

Fabrication of precision linear ways and the drive mechanism associated with the ways can be costly or difficult, particularly for large systems. Further the fabrication process is normally slow, limited by a speed at which a single carriage holding one or more printheads can be maneuvered within a framework of the ways.

SUMMARY

In an aspect, a machine may include a machine frame having a plurality of ground engaging elements to facilitate movement of the machine frame; a telescoping boom pivotably coupled to the machine frame and configured to pivot along at least a horizontal plane; a material line coupled to the telescoping boom and configured to convey a material therethrough; a printhead coupled to the telescoping boom and in fluid communication with the material line to receive the material and to dispense the material; and a controller configured to receive 3D printing information and to convert the 3D printing information into positional coordinates of the printhead, wherein the controller is configured to cause movement of the telescoping boom to position the printhead based at least on the position coordinates.

In another aspect, a machine may include a machine frame having a plurality of ground engaging elements to facilitate movement of the machine frame; a telescoping boom pivotably coupled to the machine frame and configured to pivot along at least a horizontal plane; a material line coupled to the telescoping boom and configured to convey a building material therethrough; a printhead coupled to the telescoping boom and in fluid communication with the material line to receive the building material and to dispense the building material; and a plurality of stabilizers coupled to the machine frame and moveable from a retracted position to an extended position to engage the ground, wherein the machine frame is configured to be lifted away from the ground by engaging the stabilizers to lift the machine frame.

In a further aspect, a machine may include a machine frame having a plurality of ground engaging elements to facilitate movement of the machine frame; a telescoping boom pivotably coupled to the machine frame and configured to pivot along at least a horizontal plane; a material line coupled to the telescoping boom and configured to convey a building material therethrough; a printhead coupled to the telescoping boom and in fluid communication with the material line to receive the building material and to dispense the building material; a plurality of stabilizers coupled to the machine frame and moveable from a retracted position to an extended position to engage the ground; and a support member coupled to the machine frame and rotatably coupled to the telescoping boom to allow at least two degrees of movement relative to the support member, wherein the telescoping boom is configured to be lifted away from the ground by engaging the support member to lift the telescoping boom in a vertical direction.

BRIEF DESCRIPTION OF THE DRAWINGS

FIG. 1 is a diagrammatic elevation view of a machine configured with a 3D printing system in accordance with aspects of the disclosure.

FIG. 2 is a diagrammatic elevation view of the machine of FIG. 1.

FIG. 5 is a diagrammatic elevation view of a machine configured with a 3D printing system in accordance with aspects of the disclosure.

FIG. 6 is a diagrammatic elevation view of the machine of FIG. 5.

DETAILED DESCRIPTION

Figure 3:
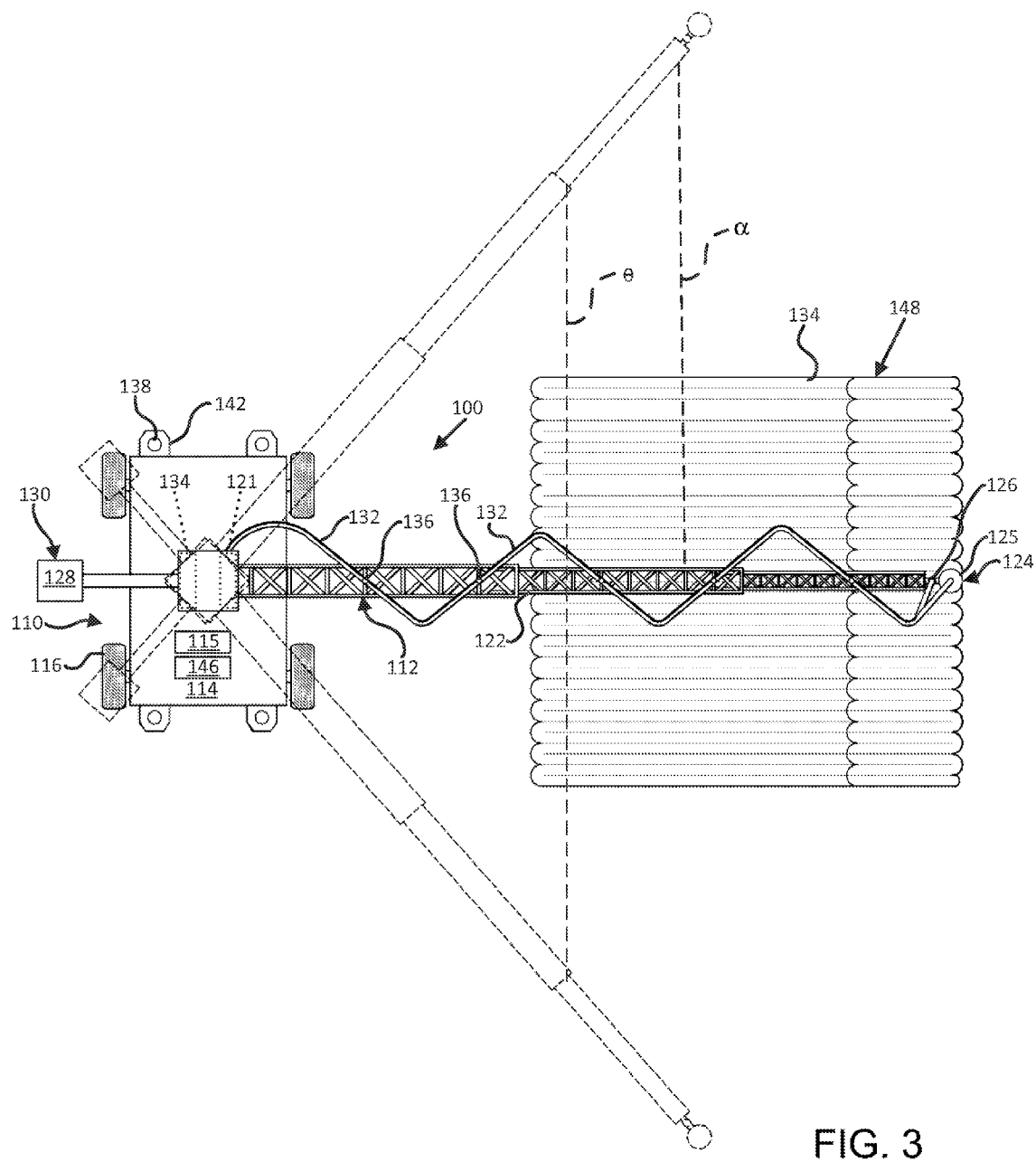
FIG. 3 is a diagrammatic top plan view of the machine of FIG. 1.
Figure 4:
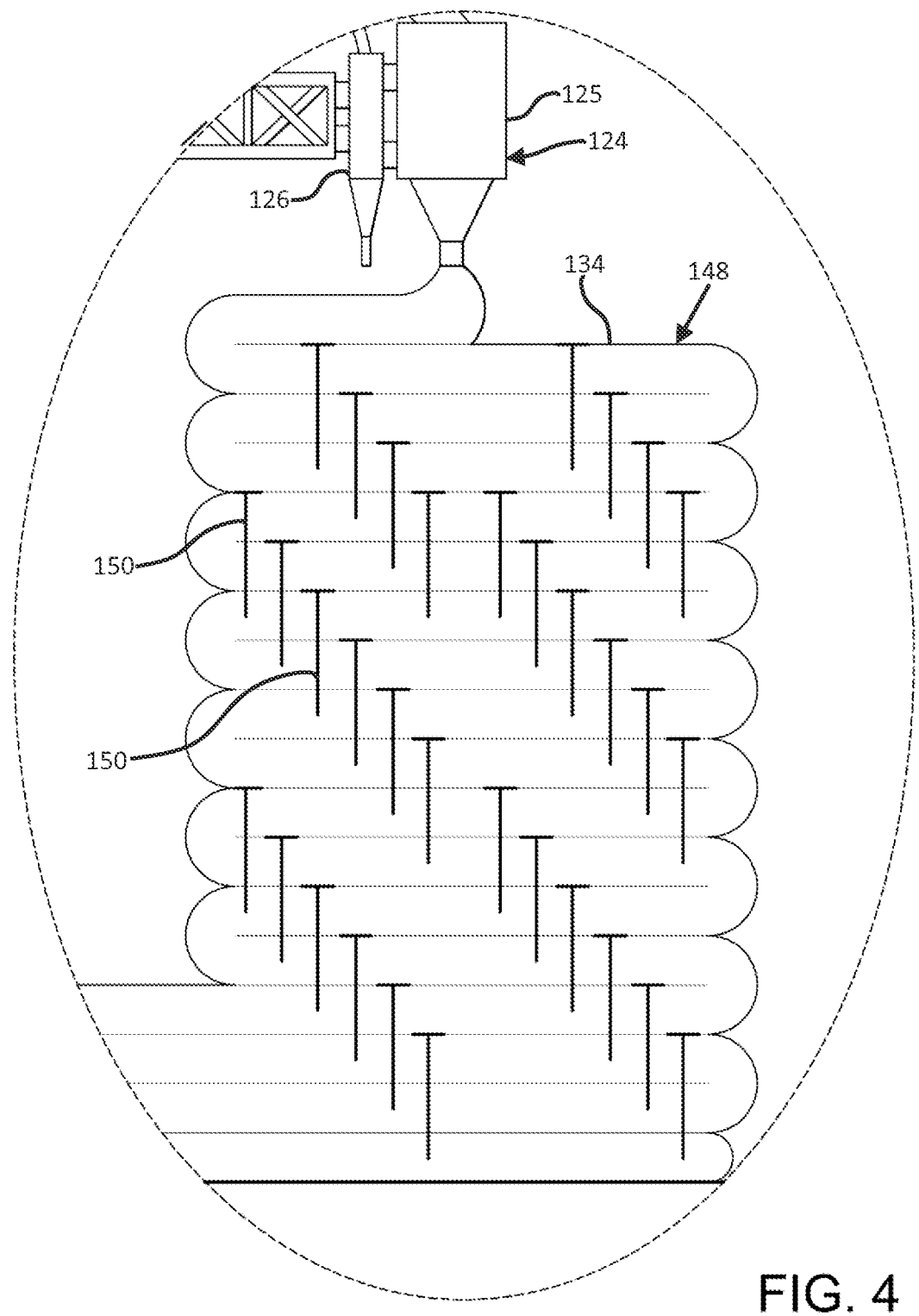
FIG. 4 is an enlarged diagrammatic view of a portion of FIG. 2.

Referring to the figures, FIGS. 1, 2, 3, and 4 illustrate an aspect of an additive manufacturing system or structural three dimensional (3D) printing system 100 in accordance with the disclosure. The printing system 100 may be used, for example, to form structural components such walls, enclosures, foundations, and the like. The printing system 100 shown in FIGS. 1-3 is a portable system mounted on a machine 110, such as tracked utility machine, wheeled machine, or any other suitable machine, via a pivotable or otherwise movable boom or booms 112. The printing system 100 may also be pivotally or otherwise movably mounted to the boom 112 so that the printing system 100 may positioned at any suitable angle with respect to the boom 112. As another example, the printing system 100 may be mounted on a fixed structure, such as a stationary frame, via a movable boom. In an aspect, the booms 112 may include one or more hydraulic cylinders 121 to control the articulation of the booms 112. Such hydraulic cylinders 121 may be configured with double-activating lock checks, as would be appreciated by one of skill in the art.

In an aspect, the machine 110 may include a machine frame 114 coupled to one or more ground engaging elements 116. As an example, the ground engaging elements 116 may include a wheel or a track (or plurality thereof) to facilitate movement of the machine frame 114 across the ground. A power source 115, such as an internal combustion engine, an electric motor or the like, may be coupled to the machine frame 114 and may be configured to generate a power output for operating the machine 110 and/or driving at least one ground engaging element 116.

The boom 112 may be pivotally attached to a pivot point 118 on machine 110 by a bracket 120 (e.g., swing pivot) as is known in the art. The boom 112 can telescope between a retracted position and a fully extended position (shown in FIGS. 1-3). To permit telescoping and/or articulation along a horizontal plane, one or more motors or hydraulic cylinders 121 may be configured to cause movement of the boom 112. As an example, the boom 112 may include a hydraulic boom telescoping cylinder 121 and a plurality of boom extensions 122. The boom 112 includes a distal end 124 to which an implement, such as a printhead 125 and/or a fastener implement 126, can be mounted. The boom 112 can accommodate other implements such as, for example, a finishing implement to effect a surface treatment. The boom 112 may be articulated about the pivot point 118 at a boom swing angle of θ. In certain aspects, the pivot point 118 of the boom 112 may be disposed off-center (e.g., closer to one side of the machine frame 114 than another). The off-center position of the pivot point 118 may facilitate a wider boom swing angle θ than a configuration having a centered pivot point 118 (e.g., due to the encumbrance of one or more stabilizer legs 138.)

A counter weight 128 may be disposed along the boom 112, for example, at a proximal end 130 opposite the distal end 124. As an example, a position and/or mass of the counter weight 128 may be adjusted based upon an extension and/or position of the boom 112. As a further example, the position of the counter weight 128 may be automatically adjusted such as moving the counter weight 128 toward and away from the proximal end 130 of the boom 112 (e.g., using a motor and/or a hydraulic cylinder).

A material line 132 may be disposed along a length of the boom 112 and may provide fluid communication between the printhead 125 and a source of building material 134. The source of building material 134 may be disposed on the machine frame 114 or may be disposed apart from the machine 110. Various materials may be provided via the material line 132 such a cement material and other structural materials. The material line 132 may be secured to the boom 112 using couplers 136 known in the art and may be disposed in a foldable (e.g., accordion-like) to manage the extension and the retraction of the material line 132 or other lines such as a pneumatic pressure line and/or electrical wires. The source of building material 134, the material line 132, and/or the printhead 125 may include a pump or similar mechanism (not shown) to assist in movement of the material. Operation of the pump or similar mechanism may be controlled by a controller 146. Additionally, the source of building material 134, the material line 132, and/or the printhead 125 may include a valve or similar mechanism (not shown) to control movement of the material. Operation of the valve or similar mechanism may be controlled by the controller 146.

A plurality of stabilizer legs 138 may be coupled to the machine frame 114. As shown in FIGS. 1-3, four stabilizer legs 138 are moveably coupled to the machine frame 114. As an example, a ratcheting mechanism may be employed to raise the platform up a predefined height per segment of ratcheting such as one inch per ratchet. A safety interlock ensures that the machine can only travel upwards, and not downwards, unless specific commands are executed in a specific order to allow the machine to decrease in height relative to the ground level. As another example, each of the stabilizer legs 138 may include a foot 140 configured to engage the ground to effect stabilization of the machine frame 114. As a further example, each of a plurality of motors 142 (e.g., stepper motors) may be configured to cause a respective one of the stabilizer legs 138 to extended toward the ground relative to the machine frame 114. Optionally one or more hydraulic cylinder may be used to cause extension of the stabilizer legs 138. As such, when the stabilizer legs 138 are extended to engage the ground, further extension by the motors 142 lifts the machine frame 114 and spaces the machine frame 114 (e.g., ground engaging elements 116) from the ground, as shown in FIG. 2. Accordingly, controlled engagement of the motors 142 may be used to control a height of the machine frame 114 and thereby the boom 112 in a 'z' axis.

In certain aspects, as the position of the machine frame 114 reaches a maximum height of the stabilizer legs 138 or a predetermined height, additional leg extenders 144 may be coupled to the vertical end of each of the stabilizer legs 138 to provide additional lift height for the machine frame 114. Various coupling mechanism may be used such as bolts, clamps, slip fits, and the like to secure the additional leg extenders 144 to the respective stabilizer legs 138. As an example, the length of the extenders 144 may be configured based on the structural design (e.g., one additional story (level) to be added to a structure per extender). A typical length may be between about 8 and about 10 feet, but other lengths may be used.

A controller 146 may be in electrical communication with various components of the printing system 100 such as the hydraulic cylinders 121, the printhead 125, the fastener implement 126, the motors 142, and the like. The controller 146 may be configured to control the movement of the boom 112, for example, by selectively actuating one or more of the hydraulic cylinders 121. As an example, the controller 146 may execute logic to control the motion of the boom 112 and the activation of one or more of the printhead 125 and the fastener implement 126 based on the following relationships:

$$x = r*\sin(\alpha); \text{ and}$$

$$y = r*\cos(\alpha),$$

where r is the extended length of the boom 112 and α is the angle between a current position and the home position, which may be pre-defined. As such, the standard 3D printing x-y coordinates may be mapped to extension 'r' and angle 'α' and the controller 146 may cause the boom 112 to move in accordance with such relationships. A 'z' coordinate of the 3D printing coordinates may be mapped to a height of the boom 112 (e.g., including the machine frame 114) and the controller 146 may cause the motors 142 to activate and lift or lower the machine frame 114 relative the stabilizer legs 138.

As an illustrative example, the machine 110 may be positioned at a site where a structure 148 is to be manufactured, for example using 3D printing. The structure 148 may be designed for construction using standard 3D printing coordinates. Such coordinates may be received by the controller 146 and may be converted to position coordinates of the boom 112, as described herein. Accordingly, the controller 146 may control a flow of building material 134 through the material line 132 and to the printhead 125 for deposition. By controlling an extension and refraction of the boom 112 along with a rotation of the boom 112 across a horizontal plane, the printhead 125 may be positioned to deposit the building material 134 in a manner provided by the 3D printing coordinates. As more clearly shown in FIG. 4, the building material 134 may be deposited in a horizontal plane an may be layered by adjusting a height of the boom 112 (e.g., by elevating the machine frame 114). One or more fasteners 150 may be disposed through a set of material layers, for example using the fastener implement 126.

Figure 7:
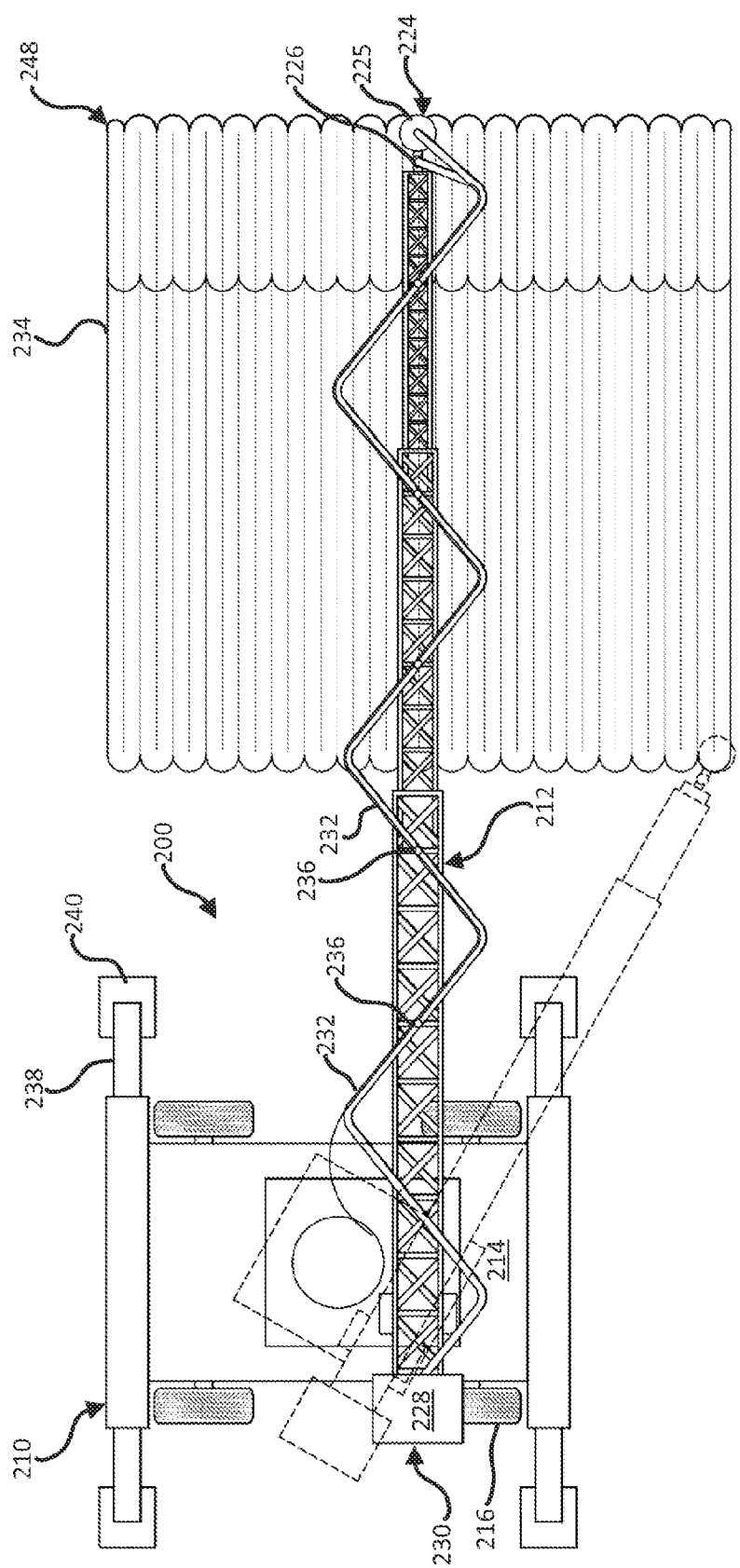
FIG. 7 is a diagrammatic top plan view of the machine of FIG. 5.

Referring to the figures, FIGS. 5, 6, and 7 illustrate an aspect of an additive manufacturing system or structural three dimensional (3D) printing system 200 in accordance with the disclosure. The printing system 200 may be used, for example, to form structural components such walls, enclosures, foundations, and the like. The printing system 200 shown in FIGS. 5-7 is a portable system mounted on a machine 210, such as tracked utility machine, wheeled machine, or any other suitable machine, via a pivotable or otherwise movable boom or booms 212. The printing system 200 may also be pivotally or otherwise movably mounted to the boom 212 so that the printing system 200 may positioned at any suitable angle with respect to the boom 212. As another example, the printing system 200 may be mounted on a fixed structure, such as a stationary frame, via a movable boom. In an aspect, the booms 212 may include one or more hydraulic cylinders 221 to control the articulation of the booms 212. Such hydraulic cylinders 221 may be configured with double-activating lock checks, as would be appreciated by one of skill in the art.

In an aspect, the machine 210 may include a machine frame 214 coupled to one or more ground engaging elements 216. As an example, the ground engaging elements 216 may include a wheel or a track (or a plurality thereof). A power source 215, such as an internal combustion engine, electric motor, or the like may be coupled to the machine frame 214 and may be configured to generate a power output for driving at least one ground engaging element 216 and/or the machine 210.

The boom 212 may be pivotally attached to a pivot point 218 on machine 210 by a bracket 220 as is known in the art. The boom 212 can telescope between a retracted position and a fully extended position as shown in FIGS. 5-7. To permit telescoping and/or articulation along a horizontal plane, one or more hydraulic cylinders 221 may be configured to cause movement of the boom 212. As an example, the boom 212 may include a hydraulic boom telescoping cylinder 221 and a plurality of boom extensions 222. The boom 212 includes a distal end 224 to which an implement, such as a printhead 225 and/or a fastener implement 226, can be mounted. The boom 212 can accommodate other implements such as, for example, a finishing implement to effect a surface treatment. The boom 212 may be articulated about the pivot point at a boom swing angle of θ. In certain aspects, the pivot point 218 of the boom 212 may be disposed off-center (e.g., closer to one side of the machine frame 214 than another). The off-center position of the pivot point 218 may facilitate a wider boom swing angle θ than a configuration having a centered pivot point 218 (e.g., due to the encumbrance of one or more stabilizer legs 238.)

A counter weight 228 may be disposed along the boom 212, for example, at a proximal end 230 opposite the distal end 224. As an example, the position and/or a mass of the counter weight 228 may be adjusted based upon an extension and/or position of the boom 212. As a further example, the counter weight 228 may be automatically adjusted.

A material line 232 may be disposed along a length of the boom 212 and may provide fluid communication between the printhead 225 and a source of building material 234. The source of building material 234 may be disposed on the machine frame 214 or may be disposed apart from the machine 210. Various materials may be provided via the material line 232 such a cement material and other structural materials. The material line 232 may be secured to the boom 212 using couplers 236 known in the art. The source of building material 234, the material line 232, and/or the printhead 225 may include a pump or similar mechanism (not shown) to assist in movement of the material. Operation of the pump or similar mechanism may be controlled by a controller 246. Additionally, the source of building material 234, the material line 232, and/or the printhead 225 may include a valve or similar mechanism (not shown) to control movement of the material. Operation of the valve or similar mechanism may be controlled by the controller 246.

A plurality of stabilizer legs 238 may be coupled to the machine frame 214. As shown in FIGS. 5-7, four stabilizer legs 238 are moveably coupled to the machine frame 214. As an example, a ratcheting mechanism may be employed to raise the platform up a predefined height per segment of ratcheting such as one inch per ratchet. A safety interlock ensures that the machine can only travel upwards, and not downwards, unless specific commands are executed in a specific order to allow the machine to decrease in height relative to the ground level. As another example, each of the stabilizer legs 238 may include a foot 240 configured to engage the ground to effect stabilization of the machine frame 214. As a further example, each of a plurality of motors 242 (e.g., stepper motors) may be configured to cause a respective one of the stabilizer legs 238 to be extended toward the ground. At least one of the stabilizer legs 238 may be configured to extend radially outward relative to the machine frame 214. Optionally one or more hydraulic cylinders may be used to cause extension of the stabilizer legs 238.

In certain aspects, a support member 244 may be disposed on the machine frame 214. The support member 244 may be centrally disposed or positioned off-center. The boom 212 may be rotatably coupled to the support member 244. A motor 245 may be configured to control a position of the boom 212 along a length of the support member 244. Optionally, one or more hydraulic cylinders may be configured to control a height of the boom 212 along the support member 244.

A controller 246 may be in electrical communication with various components of the printing system 200 such as the hydraulic cylinders 221, the printhead 225, the fastener implement 226, the motors 242, and the like. The controller 246 may be configured to control the movement of the boom 212, for example, by selectively actuating one or more of the hydraulic cylinders 221. As an example, the controller 246 may execute logic to control the motion of the boom 212 and the activation of one or more of the printhead 225 and the fastener implement 226 based on the following relationships:

$$x = r * \sin(\alpha); \text{ and}$$

$$y = r * \cos(\alpha),$$

where r is the extended length of the boom 212 and α is the angle between a current position and the home position, which may be pre-defined. As such, the standard 3D printing x-y coordinates may be mapped to extension 'r' and angle 'α' and the controller 246 may cause the boom 212 to move in accordance with such relationships. A 'z' coordinate of the 3D printing coordinates may be mapped to a height of the boom 212 (e.g., including the machine frame 214) and the controller 246 may cause the motors 242 to activate and lift or lower the machine frame 214 relative the stabilizer legs 238.

As an illustrative example, the machine 210 may be positioned at a site where a structure 248 is to be manufactured, for example using 3D printing. The structure 248 may be designed for construction using standard 3D printing coordinates. Such coordinates may be received by the controller 246 and may be converted to position coordinates of the boom 212, as described herein. Accordingly, the controller 246 may control a flow of building material 234 through the material line 232 and to the printhead 225 for deposition. By controlling an extension and refraction of the boom 212 along with a rotation of the boom 212 across a horizontal plane, the printhead 225 may be positioned to deposit the building material 234 in a manner provided by the 3D printing coordinates. The building material 234 may be deposited in a horizontal plane and may be layered by adjusting a height of the boom 212 (e.g., by elevating the machine frame 214). One or more fasteners may be disposed through a set of material layers, for example using the fastener implement 226.

INDUSTRIAL APPLICABILITY

The present disclosure is applicable to various mobile machines and machine frames that may be configured with a 3D printing system 100, 200. As an example, the machine frame 114, 214 may be configured to position the printing system 100, 200 at a location where a structure is to be built. Since the controller 146, 246 may convert standard 3D printing coordinate data to a positional data of the boom 112, 212 according to the present disclosure, the design of 3D structures and the resultant standard 3D printing coordinate data may be provided via conventional mechanism and the controller 146, 246 may convert the same to effect appropriate control over the printing system 100, 200 components to construct the desired structure.

The systems 100, 200 and machines 110, 210 of this disclosure minimize the movement and work effort expended to achieve the positioning of the print head at a point in space by using the rotational axis and extension/retraction distance to achieve the same position in space. The "z" axis is controlled by raising the work platform (e.g., the machine frame 114, 214 or boom 112, 212). Since 3D printed structures may be completed in a layer-by-layer format, the "z" axis need only be obtained once per layer, and a structure of many levels can be easily achieved by raising the platform. Additionally, the boom length combined with counterweight allows a structure (in terms of square footage) of several times larger to be constructed compared to the limited reach boom/dipper stick configuration.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A machine comprising:
   a machine frame having a plurality of ground engaging elements to facilitate movement of the machine frame, wherein the plurality of ground engaging elements includes one or more of a wheel and/or one or more of a track;
   a plurality of stabilizers coupled to the machine frame and moveable from a retracted position to an extended position to engage the ground;
   a telescoping boom pivotably coupled to the machine frame and configured to pivot along at least a horizontal plane, wherein the telescoping boom includes a plurality of boom segments, wherein in a first configuration at least one of the plurality of boom segments is slidingly received within a cavity of at least one other of the plurality of boom segments;
   a material line coupled to the telescoping boom and configured to convey a material therethrough;
   a printhead coupled to the telescoping boom and in fluid communication with the material line to receive the material and to dispense the material;
   a support member coupled to the machine frame and rotatably coupled to the telescoping boom, wherein the telescoping boom is configured to be lifted away from the ground by engaging the support member to lift the telescoping boom in a vertical direction; and
   a controller configured to receive 3D printing information and to convert the 3D printing information into positional coordinates of the printhead, wherein the controller is configured to cause movement of the telescoping boom to position the printhead based at least on the position coordinates.

2. The machine of claim 1, wherein the material is a building material.

3. The machine of claim 1, further comprising a counter weight coupled to the telescoping boom.

4. The machine of claim 3, wherein the controller is configured to adjust a position of the counter weight based at least on an extension of the telescoping boom.

5. The machine of claim 1, wherein the machine frame is configured to be lifted away from the ground by engaging the stabilizers to lift the machine frame.

6. The machine of claim 1, wherein the support member is coupled to the machine frame and rotatably coupled to the telescoping boom to allow at least two degrees of movement relative to the support member.

7. The machine of claim 1, wherein one or more of the stabilizers is configured to extend radially outward from the machine frame while extending toward the ground.

8. The machine of claim 1, wherein the controller is configured to convert the 3D printing information into positional coordinates of the printhead based at least on the following relationships: x=r*sin(α); and y=r*cos(α), where r is an extended length of the telescoping boom and a is an angle of the telescoping boom relative to a predetermined home position.

9. The machine of claim 1, further comprising a fastener implement coupled to the telescoping boom and configured to dispose one or more fasteners through a deposited material.

10. The machine of claim 1, wherein the telescoping boom is configured to pivot about a pivot point that is off-center in at least one dimension of the machine frame.

11. The machine of claim 10, wherein the telescoping boom is configured to pivot about a pivot point that is off-center in at least two dimensions of the machine frame.

12. A machine comprising:
a machine frame having a plurality of ground engaging elements to facilitate movement of the machine frame, and an internal combustion engine operably coupled to at least one of the plurality of ground engaging elements to drive the machine frame;
a telescoping boom pivotably coupled to the machine frame and configured to pivot along at least a horizontal plane, wherein the telescoping boom includes a plurality of boom segments, wherein in a first configuration at least one of the plurality of boom segments is slidingly received within a cavity of at least one other of the plurality of boom segments;
a material line coupled to the telescoping boom and configured to convey a building material therethrough;
a printhead coupled to the telescoping boom and in fluid communication with the material line to receive the building material and to dispense the building material;
a plurality of stabilizers coupled to the machine frame and moveable from a retracted position to an extended position to engage the ground, wherein the machine frame is configured to be lifted away from the ground by engaging the stabilizers to lift the machine frame; and
a support member coupled to the machine frame and rotatably coupled to the telescoping boom, wherein the telescoping boom is configured to be lifted away from the ground by engaging the support member to lift the telescoping boom in a vertical direction.

13. The machine of claim 12, further comprising a counter weight coupled to the telescoping boom.

14. The machine of claim 12, wherein one or more of the stabilizers is configured to extend radially outward from the machine frame while extending toward the ground.

15. A machine comprising:
a machine frame having a plurality of ground engaging elements to facilitate movement of the machine frame, and an internal combustion engine operably coupled to at least one of the plurality of ground engaging elements to drive the machine frame;
a telescoping boom pivotably coupled to the machine frame and configured to pivot along at least a horizontal plane, wherein the telescoping boom includes a plurality of boom segments, wherein in a first configuration at least one of the plurality of boom segments is slidingly received within a cavity of at least one other of the plurality of boom segments;
a material line coupled to the telescoping boom and configured to convey a building material therethrough;
a printhead coupled to the telescoping boom and in fluid communication with the material line to receive the building material and to dispense the building material;
a counter weight coupled to the telescoping boom, wherein the printhead is coupled to a first end of the telescoping boom and the counterweight is coupled to a second end of the telescoping boom, the second end being opposite the first end;
a plurality of stabilizers coupled to the machine frame and moveable from a retracted position to an extended position to engage the ground; and
a support member coupled to the machine frame and rotatably coupled to the telescoping boom to allow at least two degrees of movement relative to the support member, wherein the telescoping boom is configured to be lifted away from the ground from a neutral position to a lifted position by engaging the support member to lift the telescoping boom in a vertical direction, wherein the boom extends only parallel to the horizontal plane in both the neutral position and the lifted position.

16. The machine of claim 15, wherein one or more of the stabilizers is configured to extend radially outward from the machine frame while extending toward the ground.

17. The machine of claim 15, wherein the telescoping boom is configured to pivot about a pivot point that is off-center in at least two dimensions of the machine frame.

18. The machine of claim 15, wherein the machine frame has a surface parallel to the horizontal plane in both the neutral position and the lifted position.

19. The machine of claim 1, wherein the machine frame has a surface parallel to the horizontal plane in both the neutral position and the lifted position.

20. The machine of claim 12, wherein the machine frame has a surface parallel to the horizontal plane in both the neutral position and the lifted position.

* * * * *